(12) United States Patent
Heck et al.

(10) Patent No.: US 8,136,869 B2
(45) Date of Patent: Mar. 20, 2012

(54) WINDSHIELD SUPPORT STRUCTURE

(75) Inventors: Gerald Heck, Nackenheim (DE); Klaus Meinhardt, Riedstadt-Erfelden (DE); Phi-Cong Nguyen, Mainz (DE); Jürgen Vollhardt, Rüsselsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 172 days.

(21) Appl. No.: 12/362,403

(22) Filed: Jan. 29, 2009

(65) Prior Publication Data

US 2009/0195027 A1 Aug. 6, 2009

(30) Foreign Application Priority Data

Jan. 31, 2008 (DE) .......................... 10 2008 006 869

(51) Int. Cl.
*B62D 25/00* (2006.01)
(52) U.S. Cl. ........................................ 296/192; 296/201
(58) Field of Classification Search .................. 296/192, 296/201, 84.1, 96.21, 96.22, 29, 30
See application file for complete search history.

(56) References Cited

U.S. PATENT DOCUMENTS

| | | | |
|---|---|---|---|
| 4,488,753 A | 12/1984 | Koike | |
| 5,308,135 A * | 5/1994 | Stedman | 296/96.21 |
| 6,193,305 B1 * | 2/2001 | Takahashi | 296/192 |
| 6,565,148 B1 * | 5/2003 | Teramoto et al. | 296/192 |
| 6,921,126 B2 * | 7/2005 | Suh et al. | 296/192 |
| 7,316,448 B2 * | 1/2008 | Koyama et al. | 296/192 |
| 7,540,557 B2 * | 6/2009 | Shimura | 296/192 |
| 7,552,964 B2 * | 6/2009 | Saito | 296/192 |
| 7,740,307 B2 * | 6/2010 | Benvenuto et al. | 296/192 |
| 2009/0195027 A1 * | 8/2009 | Heck et al. | 296/192 |
| 2010/0187862 A1 * | 7/2010 | Kurata et al. | 296/192 |

FOREIGN PATENT DOCUMENTS

| | | |
|---|---|---|
| DE | 3151546 A1 | 7/1982 |
| WO | WO 2006092675 A2 * | 9/2006 |

OTHER PUBLICATIONS

German Patent Office, German Search Report for Application No. 102008006869.1, dated Mar. 19, 2009.

* cited by examiner

*Primary Examiner* — Lori Lyjak
(74) *Attorney, Agent, or Firm* — Ingrassia Fisher & Lorenz, P.C.

(57) ABSTRACT

A windshield support structure for a vehicle, in particular an automobile, includes, but is not limited to a front bulkhead and a windshield support connected to the front bulkhead. The windshield support is supported on the front bulkhead by means of at least one support disposed on the windshield support and the front bulkhead. A method is also provided for producing a windshield support structure.

14 Claims, 2 Drawing Sheets

−PRIOR ART−

−PRIOR ART−

WINDSHIELD SUPPORT STRUCTURE

CROSS-REFERENCE TO RELATED APPLICATION

This application claims priority to German Patent Application No. 102008006869.1, filed Jan. 31, 2008, which is incorporated herein by reference in its entirety.

TECHNICAL FIELD

The invention relates to a windshield support structure for a vehicle, in particular an automobile, comprising a front bulkhead and a windshield support connected thereto. The invention further relates to a method for producing a windshield support structure.

BACKGROUND

In the prior art, it is known on the one hand to form a windshield support or cowl 22 in one piece with a front bulkhead or on the other hand, to form a windshield support or cowl 22 and a front bulkhead as multipart and fix these to one another. In most cases, the connection of the windshield support or cowl 22 to the front bulkhead is provided with a stiffening profile, in most cases a hollow profile, so that the windshield support or cowl 22 has a sufficient stiffness for receiving the loads acting thereon. However, the profile cross sections required for this require a comparatively large amount of space so that in the engine compartment or in the passenger compartment, there is less space available for other built-in components.

The windshield support structure known in the prior art is particularly problematical in vehicles having the windshield drawn far forward, as is being increasingly frequently developed to optimize space in the interior of the vehicle.

At least one object of the invention is therefore to provide a windshield support structure, which exhibits very good stiffness with a smaller space requirement than conventional windshield support structures. A further object of the invention is to provide a method for producing a windshield support structure whereby a windshield support structure can additionally be produced simply and cost-effectively. In addition, other objects, desirable features, and characteristics will become apparent from the subsequent summary and/or detailed description, and the appended claims, taken in conjunction with the accompanying drawings and this background.

SUMMARY

The windshield support structure according to an embodiment of the invention for a vehicle, in particular for an automobile, comprises a front bulkhead and a windshield support connected thereto. According to the embodiment of the invention, it is provided that the windshield support or cowl is supported by means of at least one support disposed on the windshield support and on the front bulkhead. The support is therefore supported both on the windshield support/cowl and also on the front bulkhead and can transfer forces introduced via the windshield support/cowl to the front bulkhead. The support is preferably configured separately in this case.

The advantage of such a support is that, compared with a conventional profiling of the cowl/windshield support extending over the longitudinal extension of the windshield support, it requires a considerably smaller installation space. At the same time, the support additionally saves material and thus reduces the vehicle weight. In addition, the number of welding points required to assemble the windshield support structure can be reduced appreciably. A windshield support structure can therefore be produced more cheaply than conventional windshield support structures, which has a positive effect on the overall costs of the vehicle produced.

Preferably, at least two supports, particularly preferably three supports are provided. The three supports are preferably distributed over the extension of the windshield support/cowl in the traverse direction of the vehicle, preferably substantially uniformly, so that at least two supports are disposed each in one edge zone of the windshield support/front bulkhead reinforcement and one support is disposed in a suitable central area of the windshield support. As a result, an optimal absorption of the forces introduced via the windshield support/cowl can be achieved.

The supports are preferably configured with an approximately triangular contour, and one side substantially has the contour of the contact surface of the front bulkhead, a further side substantially has the contour of the contact surface of the windshield support/cowl, and a third side connects both end points to one another. In this case, the sides need not be configured to be rectilinear in any way but can have curved contours according to the purpose, for example, the non-abutting side can be configured to be curved according to the load path.

Furthermore, it is preferably provided that the supports consist of plastic, in particular of polyamide (hereinafter "PA"). Such supports do not tend to corrosion, are light, and can be manufactured cost-effectively. In addition, plastics are sufficiently firm to ensure the required stiffness. Due to its robustness, PA has surprisingly been found to be a particularly suitable material for the support.

A further particular advantage is obtained if the support(s) and/or the windshield support and/or the front bulkhead are provided with an adhesive, in particular an expanding adhesive, on the contact surfaces of the supports. A simple fixing of the supports on the front bulkhead and windshield support can thereby be achieved.

If the expanding adhesive is additionally heat-activated, assembly of the windshield support structure can be particularly simplified since the supports can initially be aligned in the correct position and the arrangement of front bulkhead and windshield support/cowl which has not yet been hardened can then be fixed in a furnace.

In particular, it is preferable if the supports are provided with the adhesive. In this way, the windshield support structure according to the invention can be assembled particularly easily, since the supports merely need to be attached in the correct position and the adhesive ensures a reliable connection. Application of the adhesive to the windshield support/cowl and/or to the bulkhead is thereby prevented and the aforesaid components can be guided to the belt in a stacked manner without the risk of sticking together.

A further advantageous embodiment of the windshield support structure according to an embodiment of the invention provides that latching projections, in particular clips, are disposed on the support(s), by which means the supports may be fastened to the front bulkhead and/or the windshield support. Preferably, in this case, corresponding latching points are provided on the windshield support/cowl and/or on the front bulkhead, for example, recesses into which the clips can be inserted. In this way, the support or supports can be disposed particularly easily in the provided aligned. This is particularly advantageous when an expanding adhesive is used for the fastening.

The clips are preferably injection-molded onto the supports. This allows particularly favorable production of the clips.

It is furthermore particularly provided that at least one fastening device is/are provided on the support(s) for further units of the vehicle. Such further units can, for example, comprise an air inlet, a wiper motor, and/or a brake fluid container, for which sheet metal holders no longer need to be provided on the front bulkhead or the cowl/windshield support if fastening devices are provided on the support or supports, which on the one hand reduces costs and on the other hand saves weight.

An independent idea of an embodiment of the invention provides a method for producing a windshield support structure, in particular a windshield support structure described previously, in which at least one support is disposed on a front bulkhead and on a windshield support/cowl.

In this way, a windshield support structure can be produced particularly easily since a support is easier to mount that the profiles known in the prior art, which need to be welded-on with a plurality of welding points, in order to produce a sufficiently stable connected between cowl/windshield support and front bulkhead.

A further advantage is obtained if at least two supports, preferably three supports, are disposed on a front bulkhead and on a windshield support/cowl. A windshield support structure produced by this method is particularly stable.

The support(s) is/are preferably disposed on the front bulkhead and/or on the windshield support by means of latching projections, in particular clips, disposed on the support(s). In this way, the supports can be positioned particularly easily. The clips or latching projections are preferably inserted into corresponding recesses on the front bulkhead and/or cowl/windshield holder.

An advantageous further development of the method according to an embodiment of the invention provides that an adhesive is applied to the supports and/or to the windshield support and/or to the front bulkhead in the area of the contact surfaces of the supports. During assembly of the supports, a particularly easy and secure connection between windshield support/cowl and front bulkhead can be implemented in this way.

An expanding adhesive is preferably used for this purpose. An expanding adhesive, in particular, an activatable expanding adhesive can compensate particularly effectively for production-dependent tolerances of windshield support and/or front bulkhead. In this way, it is prevented that front bulkhead and cowl/windshield support become detached from one another during the lifetime of the vehicle.

A further embodiment of the method according to the invention provides that after disposing the supports on windshield support and/or front bulkhead, the windshield support structure is heated to activate the expanding adhesive. As a result, the windshield support structure can be preassembled and aligned particularly easily, the components first being fixed in their corresponding position with respect to one another when the aligned of the components with respect to one another is correct. Premature adhesion and therefore the production of non-usable windshield supports are in this way prevented and the rejects reduced.

It is preferably provided that the preassembled windshield support structure is heated in a continuous furnace. In this way, no forces are applied to the components not yet fixed to one another during assembly, which increases the dimensional accuracy.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
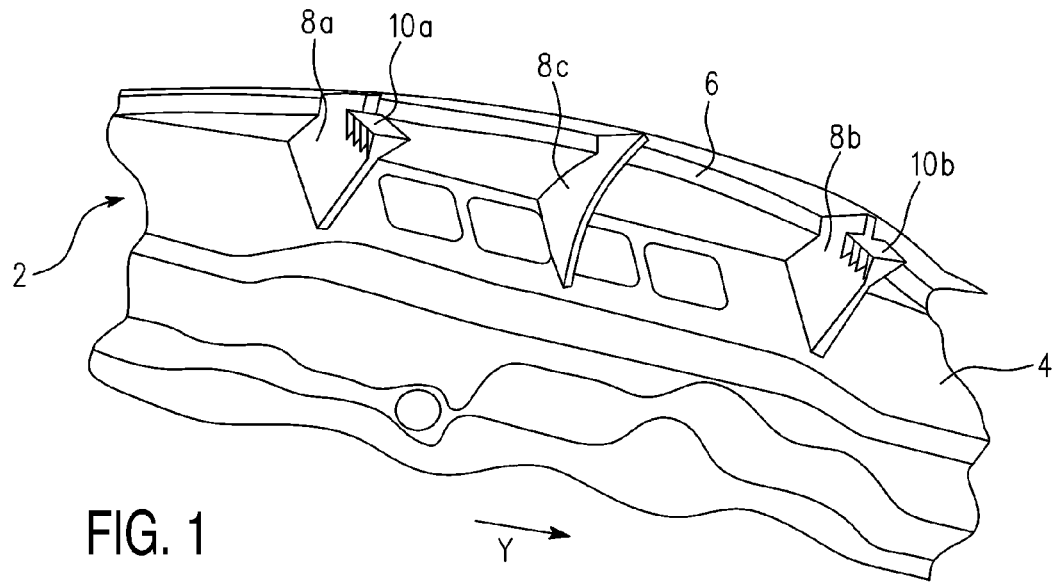
FIG. 1 shows a schematic perspective view of a windshield support structure according to the invention in a view from obliquely below.

FIG. 1 shows a windshield support structure 2 according to an embodiment of the invention, which comprises a front bulkhead 4 shown in sections and a windshield support 6. Three supports 8a, 8b, 8c are provided for supporting the windshield support 6 on the front bulkhead 4, these supports being connected to windshield support 6 and front bulkhead 4 with one another.

The supports 8a, 8b, 8c are thereby distributed over the extension of the windshield support structure 2 disposed along a vehicle transverse axis Y. The supports 8a, 8b, 8c in this case each have contours adapted to the windshield support 6 or front bulkhead 4 in the area of the respective contact surfaces. One free side of the supports 8a, 8b, 8c is expediently configured in such a manner that loads introduced from the windshield support 6 are guided to the front bulkhead 4, for example, in a straight or curved manner.

Figure 4:
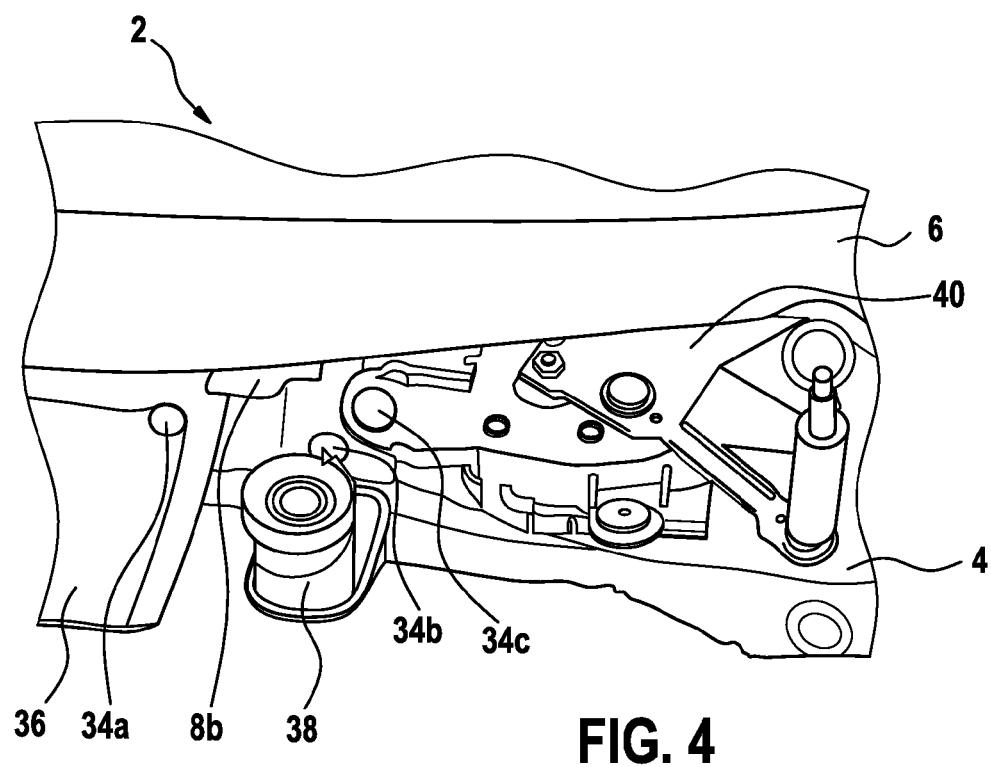
FIG. 4 shows a windshield support structure according to an embodiment of the invention in a schematic perspective view with mounted additional units.

Fastening devices 10a, 10b for further units are disposed on the outer supports 8a, 8b (cf. FIG. 4).

Figure 2A:
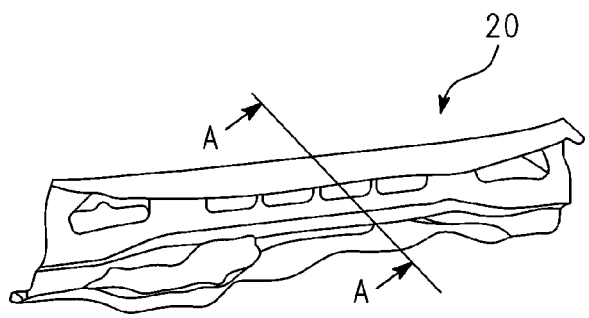
FIG. 2a and FIG. 2b show a conventional windshield support structure according to the prior art in a perspective three-dimensional view and in a sectional view.
Figure 2B:
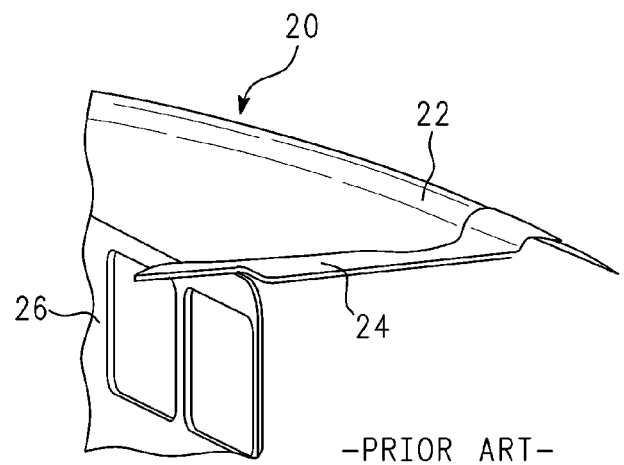

FIG. 2a and FIG. 2b show a windshield support structure 20 known from the prior art. In this case, FIG. 2b shows a section along the line of intersection A-A according to FIG. 2a.

A cowl 22 is connected via a reinforcing profile 24 to a front bulkhead 26. The conventional windshield support structure requires a comparatively large amount of space since the reinforcing profile 24 must have a large volume so that the windshield support structure 20 is sufficiently stable.

Figure 3:
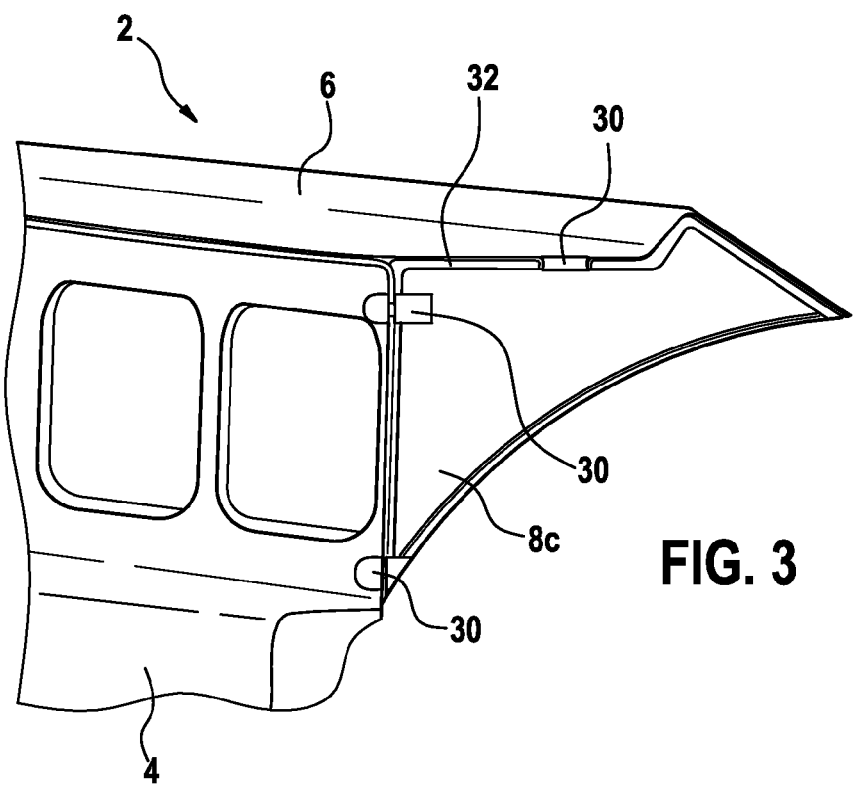
FIG. 3 shows an enlarged section of a windshield support structure according to the invention in a perspective three-dimensional view.

FIG. 3 shows a section of the windshield support structure 2 according to an embodiment of the invention in an enlarged view. The support 8c shown is positioned on front bulkhead 4 and windshield support 6 by means of clips 30 injection-molded into the support 8c. The support 8c consists of PA.

A heat-activatable, expanding adhesive 32 is applied to the support 8c in the area of the contact surfaces of the support 8c on front bulkhead 4 or windshield support 6. The expanding adhesive 32 is activated by the action of heat, for example, in a continuous furnace and expands in the direction of the front bulkhead 4 and the windshield support 6. In this way, the support 8c is connected to front bulkhead 4 and the cowl by means of an extensive connection via the entire contact surfaces. In this way, the supports 8a and 8b not shown in FIG. 3 are secured.

FIG. 4 shows a windshield support structure 2 according to an embodiment of the invention in a section wise, schematic perspective view. Fastening means 34a, 34b, 34c are provided on the supports, for example, the support 8b shown in FIG. 4, to which, for example, an air inlet 36, a brake fluid container 38, as well as a wiper motor 40 for a windshield wiper can be fastened.

While at least one exemplary embodiment has been presented in the foregoing summary and/or detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and/or detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A windshield support structure for a vehicle, comprising:
    a front bulkhead;
    a cowl connected to the front bulkhead; and
    a support disposed on the cowl and the front bulkhead and adapted to support an underside of the cowl on the front bulkhead wherein the cowl is enabled to support a windshield.

2. The windshield support structure according to claim 1, further comprising a second support.

3. The windshield support structure according to claim 2, further comprising a third support.

4. The windshield support structure according to claim 1, wherein the support is at least partially formed from a plastic.

5. The windshield support structure according to claim 1, wherein the support is provided with an adhesive on a contact surface of the support.

6. The windshield support structure according to claim 1, wherein a latching projection is disposed on the support by which the support may be fastened to at least one of the front bulkhead or the cowl.

7. The windshield support structure according to claim 1, further comprising a fastening device on the support configured to receive a further unit of the vehicle.

8. A method for producing a windshield support structure, the method comprising the steps of:
    connecting a front bulkhead and a cowl; and
    disposing a support on the front bulkhead and on the cowl to support an underside of the cowl, wherein the cowl is enabled to support a windshield.

9. The method according to claim 8, further comprising the step of disposing a second support on the front bulkhead and on the cowl.

10. The method according to claim 8, wherein the step of disposing comprising latching at least one of the front bulkhead or the cowl.

11. The method according to claim 8, further comprising the step of applying an adhesive to at least one of the support, the cowl, or the front bulkhead in an area of contact surfaces of the support.

12. The method according to claim 11, wherein the adhesive is an expanding adhesive.

13. The method according to claim 12, further comprising the step of heating the windshield support structure to activate the expanding adhesive after the disposing the support on at least one of the cowl or the front bulkhead.

14. The method according to claim 13, wherein the step of heating is conducted in a continuous furnace.

\* \* \* \* \*